Sept. 16, 1969 J. A. PUTMAN 3,467,337
RESTRAINT DEVICE
Filed April 3, 1967 4 Sheets-Sheet 2
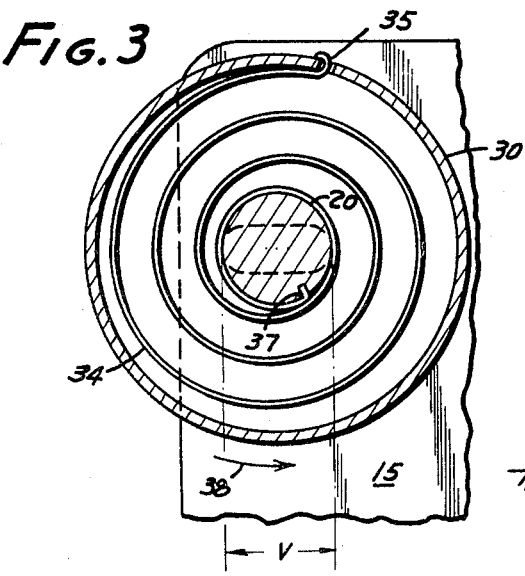
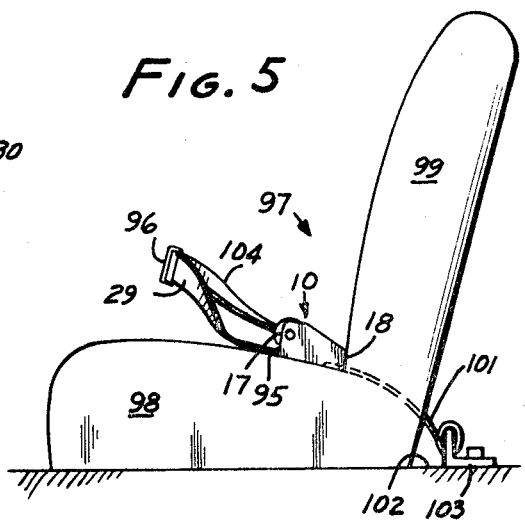
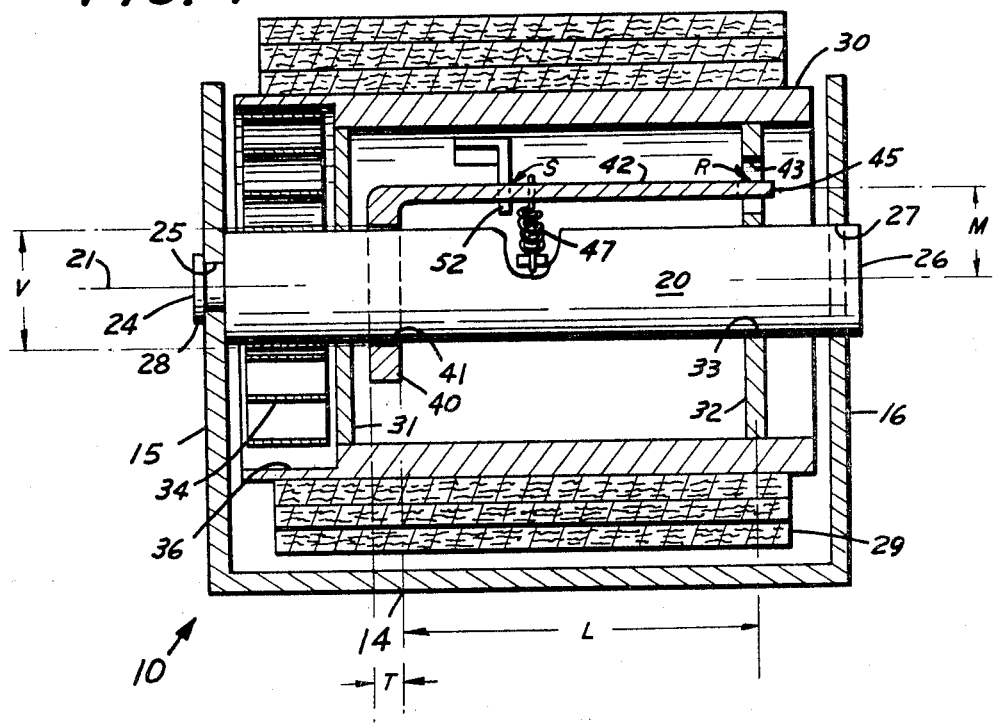
INVENTOR.
JAMES A. PUTMAN
BY
ATTORNEYS.

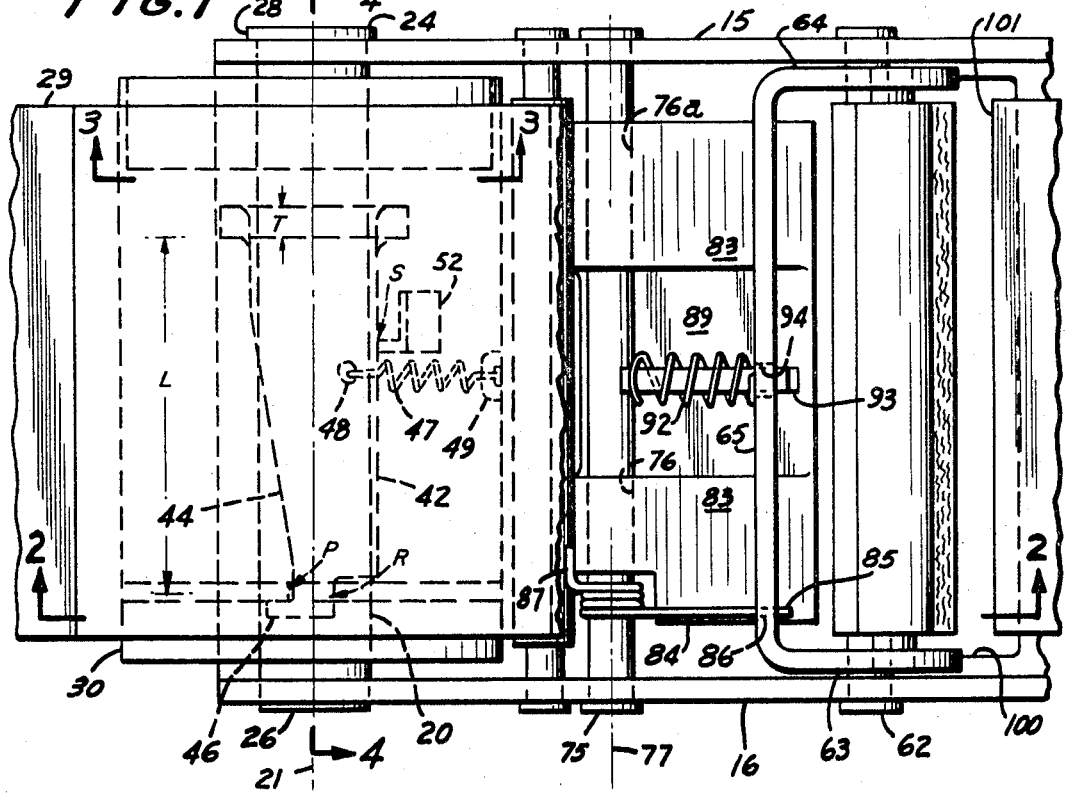
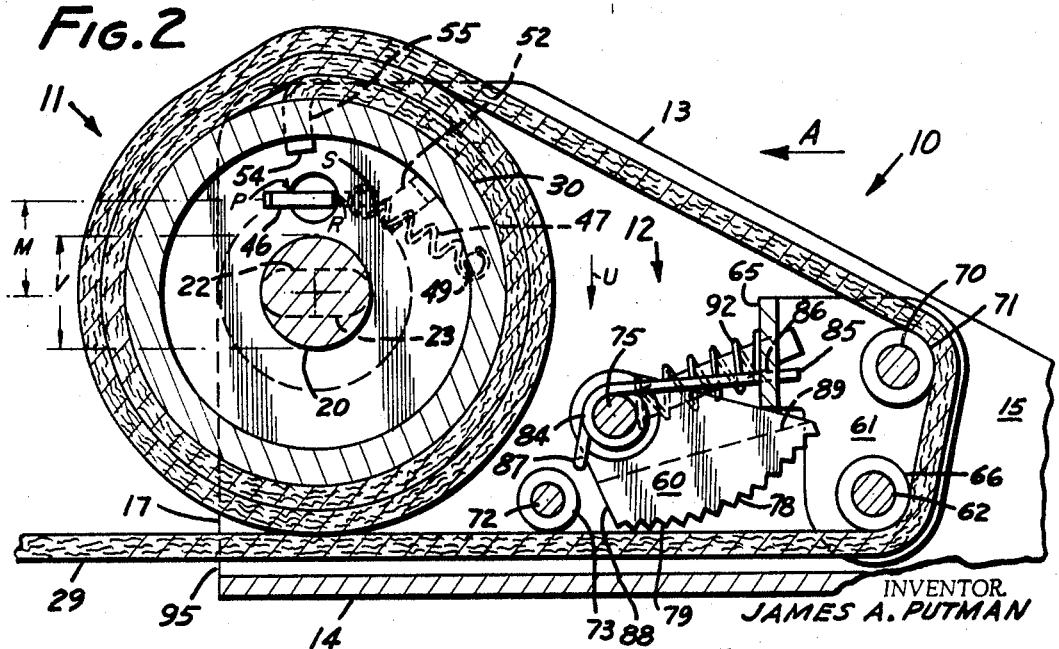

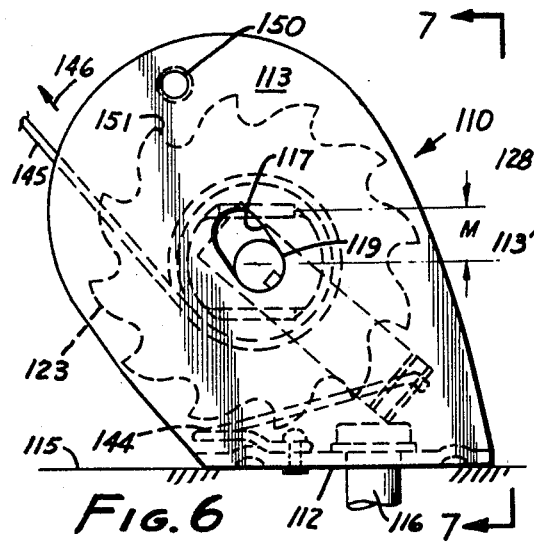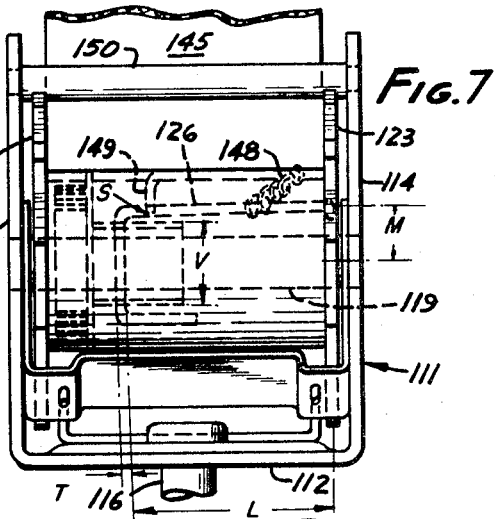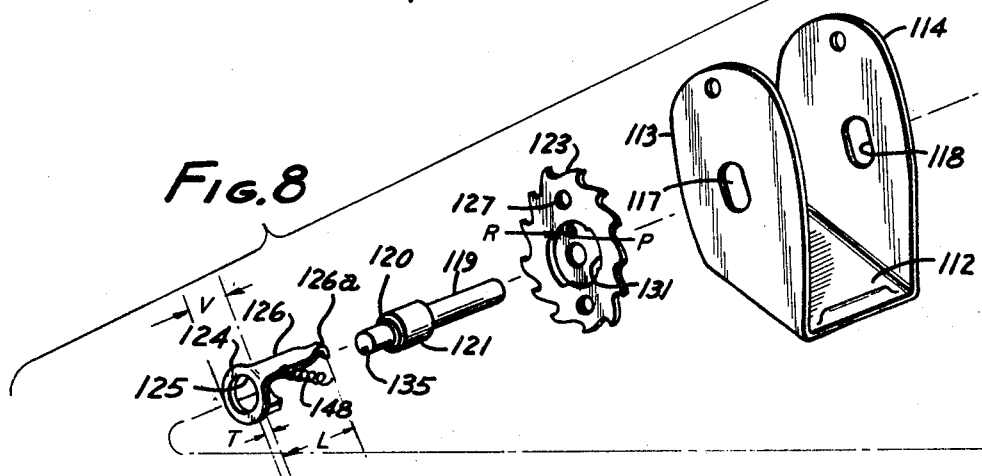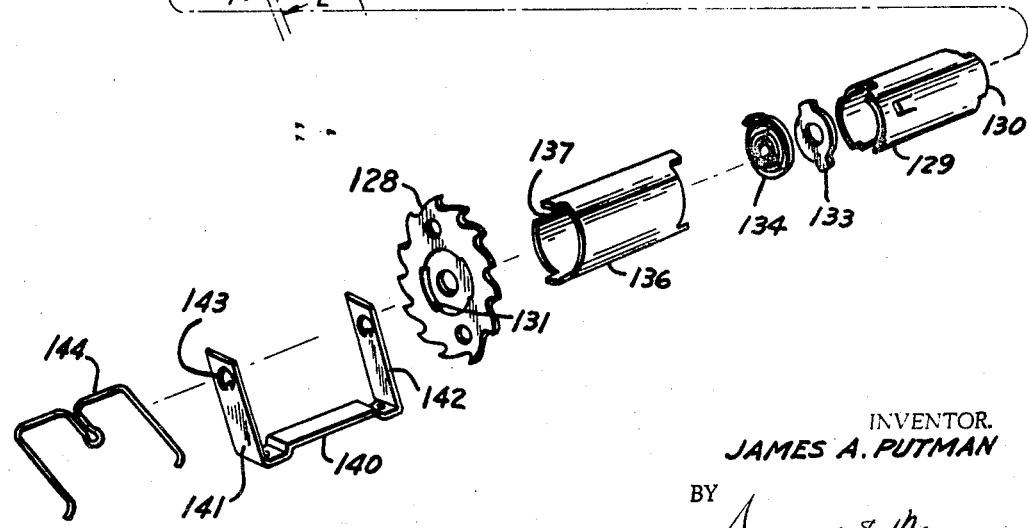

Sept. 16, 1969   J. A. PUTMAN   3,467,337
RESTRAINT DEVICE
Filed April 3, 1967   4 Sheets-Sheet 4
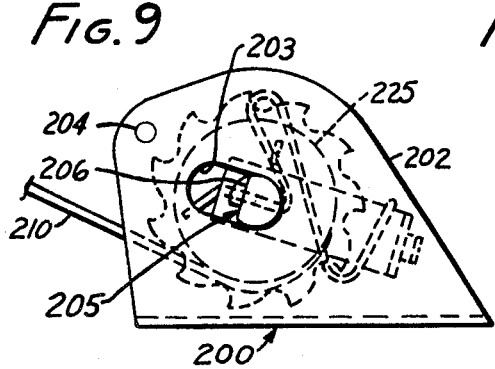
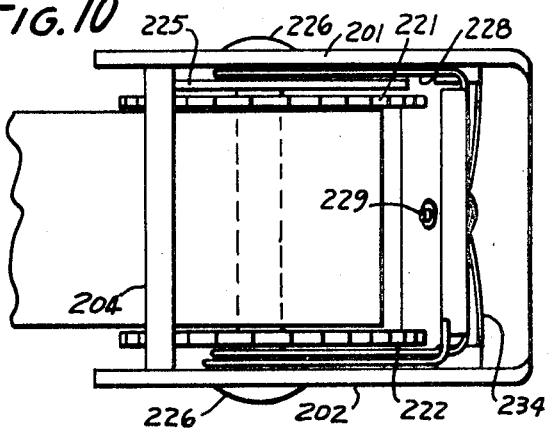
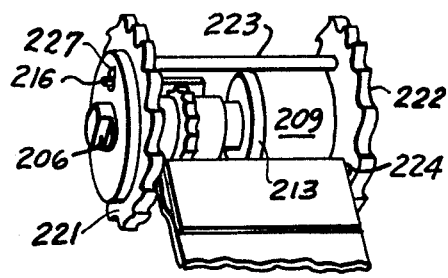
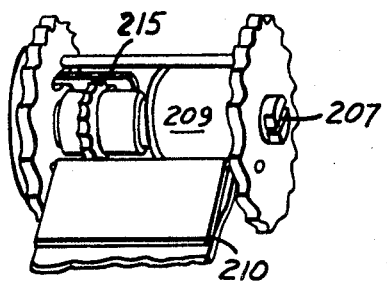
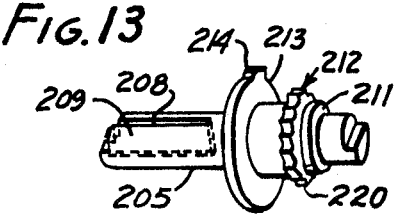
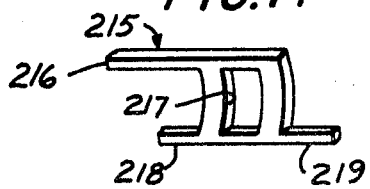
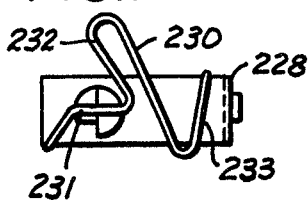
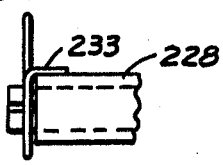
INVENTOR.
JAMES A. PUTMAN
BY
ATTORNEYS.

United States Patent Office 3,467,337
Patented Sept. 16, 1969

3,467,337
RESTRAINT DEVICE
James A. Putman, 10953 Nestle Ave.,
Northridge, Calif. 91324
Continuation-in-part of application Ser. No. 360,307,
Apr. 16, 1964. This application Apr. 3, 1967, Ser.
No. 633,658
Int. Cl. B65h 75/48
U.S. Cl. 242—107.4                     20 Claims

ABSTRACT OF THE DISCLOSURE

A restraint device employs an inertia member to engage a reel assembly with a shaft and to actuate a reel lock to prevent payout of a seat belt section. In one embodiment, the inertia member has a cantilever arm which engages the reel assembly and is mounted through a washer to a nonrotatable shaft. Upon sufficient angular acceleration of the reel, the washer engages the shaft, because of the inertial lag of the cantilever arm, to restrain rotation of the reel. Another embodiment employs a pawl pivotally mounted to the reel and engaged by an inertia member. At a predetermined angular acceleration of the reel, the inertia member pivots the pawl inwardly to engage a lock ring on the shaft and restrain rotation of the reel. Locking is effected by either a clamp which is sensitive to belt tension to engage the belt and force it tightly against a pressure surface or by lateral shifting of the reel into a position where sprockets of the reel engage a bar. In the embodiments employing sprockets, a braking member may be used to permit some rotation of the reel after a predetermined acceleration thereof is experienced to allow the reel to rotate slightly into proper engagement with the bar.

---

This is a continuation-in-part of applicant's copending application, Ser. No. 360,307, filed Apr. 16, 1964, entitled "Clamping Device," now abandoned.

This invention relates to restraint devices, and more particularly to devices for controlling seat belts used in vehicles.

A primary object of this invention is to provide a seat belt restraining device which does not require adjustment by the passenger. A related object is to provide a seat belt storage means operable to pay out additional belt length as the passenger's comfort or his movements necessitate, yet is operable to restain further payouts whenever the belt is pulled at an acceleration rate equal to or greater than some predetermined rate. Another object of this invention is to provide a clamp means operable to restrain belt payout whenever there is deceleration of the vehicle at or above a predetermined deceleration rate.

Conventional seat belts incorporate a buckle for fastening purposes. When the passenger sits in the seat he closes the buckle and then adjusts the belt by pulling an end of the belt until he is firmly held in the seat. Due to the tight loop around the passenger, this type of seat belt arrangement can be uncomfortable after long periods in the vehicle. Because of this discomfort, many passengers either do not use the seat belts at all, or else leave the belt in a loose loop around them, which is little better than if they had no belt on at all. Sometimes the belt loop works itself into a loose loop without the passenger realizing that the belt has lost its primary function.

This invention overcomes the above disadvantages, and is carried out by looping the seat belt with a buckle around a passenger in the normal manner, and firmly securing one end of the belt to the floor. The other end of the belt is attached to a seat belt clamping device which is also connected to the floor. The clamping device includes a belt storage reel and guide rollers guiding the seat belt through the clamping device to the storage reel. The seat belt storage reel is biased to pull surplus belt length back onto the reel, thus forming a loop of constant belt tension around the passenger. Under normal operation the reel may either pull in or pay out belt length when the passenger moves around at less than a predetermined acceleration rate. According to a feature of the invention, means is provided to lock the reel when a higher acceleration rate is applied. The principle of operation of the device utilizes the difference in acceleration of the belt payout by the storage reel between normal operation and the abrupt increase in belt payout rate, occasioned by, for example, an accident. Should the storage reel suddenly be forced by the belt to pay out rapidly, as in the case of an accident, the device will cause the reel to stop, thus prohibiting additional payout of belt length. Such an increase in belt tension causes the clamp to bear against the belt and restrain additional belt payout from the device.

According to a preferred but optional feature of this invention, the belt storage reel carries a sprocket wheel which is rotatable on a shaft supported within a frame so as to shift laterally therein. When the reel is stopped at the predetermined acceleration rate, the shaft slides within the frame to a position whereby the sprocket wheel is restrained from further rotation. Thus, the storage reel is restrained from rotating and there is an additional lock preventing payout of seat belt.

According to still another preferred but optional feature, a spring is provided to lock the device should its main rewinding spring be disabled.

The above and other features of this invention will be completely understood from the following detailed description and the accompanying drawings, in which:

FIG. 1 is a top view, partly cut away, of an embodiment of a clamping device in accordance with this invention;

FIG. 2 is a cross-sectional view of the clamping device taken at line 2—2 of FIG. 1;

FIG. 3 is a cross-sectional view taken at line 3—3 of FIG. 1;

FIG. 4 is a cross-sectional view taken at line 4—4 of FIG. 1;

FIG. 5 is a side view of a seat showing a suitable location of a clamping device in accordance with this invention;

FIG. 6 is a side elevation of a presently preferred embodiment of the invention;

FIG. 7 is an end view taken at line 7—7 of FIG. 6;

FIG. 8 is an exploded view of FIG. 6;

FIG. 9 is a side elevation of a presently preferred embodiment of the invention;

FIG. 10 is a top view of FIG. 9;

FIGS. 11 and 12 are left- and right-hand fragmentary perspective views of portions of the device shown in FIG. 9;

FIGS. 13 and 14 are perspective views of other parts of the device of FIG. 9;

FIG. 15 is a fragmentary side elevation of another portion of the device of FIG. 9; and FIG. 16 is a right-hand end view of FIG. 15.

FIG. 1 shows a clamping device 10 for seat belts, in accordance with this invention, which includes a reel assembly 11 and a clamp assembly 12 mounted within a housing 13 as shown in FIG. 2. The housing has a bottom plate 14 with two parallel side walls 15 and 16 extending longitudinally on opposite sides and in planes substantially perpendicular to the bottom plate. Side walls or plates 15 and 16 are each shown to have a front edge 17 and a rear edge 18, as shown in FIG. 5, to define their longitudinal limits.

Reel assembly 11 comprises a circular shaft 20 spaced from bottom plate 14. Shaft 20 is located on an axis of rotation 21, substantially perpendicular to the planes of side walls 15 and 16, and is supported thereon. Shaft 20 is ground on opposing sides 22 and 23 at an end 24 to form a substantially elliptical cross-section as seen in FIG. 2. Shaft 20 is supported on side wall 15 by inserting end 24 into a matching elliptical hole 25, thus making shaft 20 nonrotatable in the housing. The opposite end 26 from end 24 of shaft 20 is inserted through a circular hole 27 in wall 16. In order to keep the shaft from slipping out of the housing through hole 27, end 24 is flared out at 28 over the edge of hole 25.

A cylindrical drum 30 (FIG. 4), having a longitudinal length sufficient to engage with the end of a seat belt section 29, is disposed around shaft 20 and concentrically about axis 21. It is supported by two drum disks 31 and 32 which are disposed in planes perpendicular to axis 21. Disks 31 and 32 are spaced from each other and each has a centrally located hole 33 sized to make a loose fit on shaft 20 so as to be able to rotate thereon.

Disks 31 and 32 are rigidly attached at their circumferences to drum 30 so as to rotate with the drum. One method of attachment is to make the diameters of the disks of such a size as to provide a press fit into the drum. Disk 31 is spaced from an end of drum 30 to provide an opening for a coil spring 34 connected between shaft 20 and drum 30. Additional space which extends along axis 21 to disk 31 is provided by a counterbore 36 in the wall of drum 30. Spring 34 is connected to drum 30 in a slot 35, and to shaft 20 in a slot 37. Spring 34 is wound to produce a biased counterclockwise rotation of drum 30 signified by arrow 38 in FIG. 3.

A circular cantilevered washer 40, having a centrally located hole 41 to accept shaft 20 and rotate relative thereto, is disposed adjacent disk 31. One end of a cantilever arm 42 is rigidly attached to the outer circumferential edge of washer 40. The arm extends parallel to longitudinal axis 21. The washer clears the shaft which it surrounds, and because of this clearance, the cantiliver arm can move in a direction which includes a tangential component relative to a circular path around the center of rotation of the shaft. Disk 32 is spaced from the end of drum 30 and has a circular hole 43 located between shaft 20 and drum 30 to accept the free end of arm 42. Hole 41 in washer 40 is of sufficient size to provide a loose fit on the shaft to allow washer 40 to wobble thereon. Hole 43 on disk 32 is of sufficient size to permit radial movement of arm 42.

Arm 42 has a taper 44 (FIG. 1) that lessens the cross-sectional area of the arm as the distance from the washer increases, and terminates at the free end 45. End 45 has a dog leg 46 (shown in FIG. 1) adapted to hook onto disk 32. A tension spring 47 is connected between drum 30 and arm 42, tending to pull arm 42 in a clockwise direction (shown in FIG. 2) when drum 30 moves clockwise,, and thus opposes spring 34. Spring 47 is shown to be hooked through a hole 48 in arm 42 and to an eye 49 attached to the drum, as shown in FIG. 2. Due to the loose fit of washer 40 on shaft 20 and the force on arm 42 by spring 47, a bracket 52 is attached to the inside wall of drum 30 and extends radially inward to abut against arm 42 to maintain a generally parallel alignment. An end 54 of seat belt 29 passes through a longitudinal slot 55 in drum 30 and is spirally wound around the drum in a clockwise direction shown in FIG. 2.

Clamping assembly 12 comprises a cam shaped clamp 60 and a clamp actuator 61. Clamp actuator 61 is mounted on a shaft 62 which is supported by side walls 15 and 16 adjacent rear end 18 of the clamping device. Shaft 62 extends substantially parallel to longitudinal axis 21. Actuator 61 has two flanged members 63 and 64 on opposite ends of a clamp-abutting member 65, which are rotatably engaged on shaft 62 adjacent side walls 15 and 16. A seat belt guide roller 66, having a length substantially the same as the width of seat belt 29, is mounted concentrically on shaft 62 and is adapted to rotate thereon.

A belt tension roller shaft 70, parallel to shaft 62, is supported by flange members 63 and 64. Shaft 70 is spaced from and disposed above shaft 62 (FIG. 2), on the side opposite from bottom plate 14. A belt guide roller 71, similar to roller 66, is mounted concentrically on shaft 70 and adapted to rotate thereon. A third shaft 72 and guide roller 73, parallel to longitudinal axis 21, are supported by side plates 15 and 16 at a distance from shaft 62 toward front edge 17. Shafts 62 and 72 are disposed at a distance above the bottom to allow only enough clearance for belt webbing to be easily passed between guide rollers 66 and 73 and bottom plate 14.

Cam-shaped clamp 60 is rotatably engaged on shaft 75 through two holes 76 and 76a located in the clamp. Shaft 75 is supported by side plates 15 and 16 on an axis of rotation 77 substantially parallel to axis 21. Shaft 75 is disposed to allow clamp 60 to swing freely, in the absence of external forces, in a region between rollers 73 and 66. Clamp 60 is operable to press belt 29 against bottom plate 14 and lock the belt. Shafts 62, 72 and 75 are each flanged out at their ends on the outside of side walls 15 and 16, similar to end 24 of shaft 20, to maintain the shafts in proper position.

When clamp device 10 is placed in a vehicle (not shown), and oriented relative to the forward direction indicated by arrow A, the clamp is aligned to rotate clockwise on shaft 75 (shown in FIG. 2) by its own inertia when the vehicle is in a state of deceleration. Clamp 60 has a facial edge 78 adapted to bear against the belt when the clamp rotates in a clockwise manner. The facial edge, increasing in radius from shaft 75 when viewed in a counterclockwise moving manner in FIG. 2, has teeth 79 adapted to engage the belt, and, with additional payout of belt length, to force the belt against a pressure surface on bottom plate 14. As the belt tension outside device 10 increases, so does the clamping force.

Clamp-abutting member 65 is disposed to strike a top surface 83 of clamp 60 when flange members 63 and 64 rotate counterclockwise as viewed in FIG. 2. A torsion spring 84, wound around shaft 75, has an end 85 extending through a hole 86 in member 65 of clamp actuator 61 and is braced by bending the opposite end 87 against a front face 88 of clamp 60. Spring 84 is biased to force clamp 60 against and follow the movement of abutting member 65 of clamp actuator 61. A centrally located access port 89 between holes 76 and 76a of clamp 60 provides space for placement of a compression spring 92 between shaft 75 and extending to abutting member 65. A spring guide 93 is attached centrally to shaft 75 and extends radially through a hole 94 in member 65 to hold spring 92 in place. Hole 94 is of sufficient size to allow guide 93 to slide therein.

Belt 29 extends from the reel assembly in a clockwise manner around guide rollers 71 and 66. The belt extends from roller 66 on a plane substantially parallel with bottom plate 14 and directly adjacent thereto. The belt further passes between roller 73 and bottom plate 14 and out of device 10 at an outlet 95 between reel assembly 11 and bottom plate 14. The free end of the belt terminates in a buckle connector 96 as shown in FIG. 5.

FIG. 5 shows a seat 97 with clamping device 10, as described in FIGS. 1 through 4, resting on the seat pad 98 adjacent the seat back 99. Clamping device 10 has a slot 100 shown in FIG. 1 extending substantially perpendicular to side walls 15 and 16 in the end of bottom plate 14 adjacent rear edges 18 of walls 15 and 16. Slot 100 allows one end of a bracing belt section 101 to pass through and be joined to the clamp device. The opposite end of belt 101 is securely fastened to a floor 102 behind seat 97 by means such as a securely bolted tie bracket 103. A complementary seat belt section 104 extends from a mating buckle connector of connector 96 to the opposite end and is securely fastened to the floor behind chair 97 similar to belt section 101.

While FIG. 5 shows clamping device 10 to be located on the passenger's seat pad, it should be understood that the device may as readily and effectively be attached directly to the floor and still perform in the specified manner. It is only necessary that the device be in a position to allow clamp 60 to be free-swinging on shaft 75 and be able to pivot onto seat belt section 29 adjacent bottom plate 14.

Prior to operation of the clamping device, belt 29 is in a retracted position in the device and wound onto reel assembly 11 so that buckle connector 96 is abutting outlet 95. The passenger pulls slowly on buckle 96 to withdraw belt 29 from clamping device 10 to buckle himself in the seat. After connecting the buckle, the tension of spring 34 will wind the excess length of seat belt 29 onto drum 30 to make a tight-fitting belt loop around the passenger. The passenger is free, however, to shift in the seat, providing his motion is not fast and abrupt. Should he change his position slightly he will cause a small increase in belt tension, and drum 30 will be forced to rotate clockwise, as shown in FIG. 2, causing the device to pay out belt length as required. Should the passenger shift again, providing slack belt length, spring 34 will cause drum 30 to pull it into the clamp device.

FIG. 2 shows clamping device 10 in a neutral position such that the reel assembly may pull in or pay out belt length as required. When the vehicle is in a state of deceleration, free-swinging, cam shaped clamp 60 is pivoted on shaft 75 by the decelerating forces. Clamp 60 pivots clockwise from the neutral position shown in FIG. 2 until facial edge 78 bears against belt 29. Teeth 79 bite into the belt and pinch the belt against bottom plate 14, thus preventing belt payout should the passenger's body weight pull against it.

Should an accident occur wherein the inertia of the passenger causes him to continue forward when the automobile is suddenly stopped, tension will increase in belt 29 which will act to turn the drum. The higher tension level resulting from a sudden stoppage, in comparison to the forces exerted by the passenger in normal driving conditions, will tend to cause the drum to rotate at a faster rate of speed.

However, washer 40 is connected to the drum only through spring 47 at normal payout rates. When the drum turns, the spring pulls arm 42 without cocking the washer. When the acceleration of the drum exceeds a given value, the spring is stretched, pulling the arm in a direction which has a tangential component, and the washer and drum are rotatably shifted relative to one another. Then the wall of the drum strikes the arm, cants the washer, and the washer locks onto the stationary shaft. The situation continues and the arm and washer lock the drum so long as the force level is maintained on the belt. When the force level drops, the drum backs off under the force of the coil spring, the washer releases, and the belt can again be paid out and taken in at gradual rates.

FIGS. 6, 7 and 8 show a presently preferred embodiment of a clamp 110, in accodance with this invention, adapted to be mounted to the floor of a vehicle. A frame 111 having a bottom 112 and two side walls 113 and 114 is mounted by pin 116 to the floor 115 of the vehicle, behind the seat. Walls 113 and 114 each has a centrally located hole 117 and 118 respectively, adapted to support a shaft 119 on an axis substantially parallel to bottom 112.

A resilient tubular braking member 120 extends around the circumference of shaft 119 along a portion of the length of shaft 119. A protective tubular sleeve 121 extends around the circumferential periphery of braking member 120. Braking member 120 conveniently comprises a nylon tube which makes a tight fit between shaft 119 and sleeve 121. The closeness of fit is selected so that sleeve 121 can be made to turn relative to shaft 119, upon the exertion of a preselected torque. A sprocket wheel 123 is rotatably engaged on shaft 119 adjacent side wall 114.

A cantilevered washer 124 is mounted on protective sleeve 121 and has a central opening 125 to permit a loose fit thereon. Washer 124 has a cantilever arm 126 attached at an edge of its periphery and extending parallel to shaft 119 through an opening 127 in sprocket wheel 123. A dog leg 126a at the end of arm 126 keeps the arm from slipping out of opening 127.

A second sprocket wheel 128 is rotatably engaged to shaft 119 at the end opposite wheel 123. A tubular drum 129 extends coaxially with shaft 119. Drum 129 has diametrically opposing protrusions at each end, such as protrusion 130, adapted to mate with corresponding openings, such as opening 131, in sprocket wheels 123 and 128, thus fixing wheels 123 and 128 to drum 129.

A washer 133 has an outer periphery adapted to mate with drum 129 adjacent sprocket wheel 128. A coiled spring 134 is attached to a protrusion on drum 129 and extends to a longitudinal keyway 135 on shaft 119 adjacent washer 133. Spring 134 is biased to rotate drum 129 counterclockwise as in FIGS. 2 and 6. A sleeve 136 having a longitudinal slot 137 extends along drum 129. Slot 137 is adapted to accept an end of a seat belt 145 to facilitate pinching it between drum 129 and sleeve 136 and thereby to hold the belt firmly.

A bracket 140 has two outwardly extending arms 141 and 142 at opposite ends thereof. Arms 141 and 142 each has a keyed opening, such as opening 143, adapted to mate with keyway 135 of shaft 119 and rotate therewith. A spring 144 (FIG. 6) is attached to bracket 140 and biased to pull the bracket toward bottom 112.

Seat belt 145 is wound around sleeve 136 as shown in FIG. 6 and extends outwardly, signified by arrow 146, to pass between the back and seat of a chair (not shown) and around a passenger. Slots 117 and 118 in side walls 113 and 114 are oblong in shape, each having a major axis substantially parallel to arrow 146 such that shaft 119 may slide therein when belt tension exceeds the tension of spring 144.

A tension spring 148 is attached to cantilever arm 126 and connects to drum 129. As drum 129 rotates, spring 148 causes cantilevered washer 124 to rotate and follow the rotation of drum 129. A protrusion 149 extending radially inward from the peripheral wall of drum 129 serves to prevent arm 126 from causing washer 124 to cock against sleeve 121.

A restraining pin 150 is supported by side walls 113 and 114 and is adapted to engage with sprocket wheels 123 and 128 when shaft 119 slides within oblong holes 117 and 118 in the direction of belt tension. When teeth 151 of the sprocket wheels engage with restraining pin 150, the sprocket wheels will be restrained, causing the drum to stop rotating.

The presently preferred embodiment of the invention is shown in FIG. 9. It includes a base member 200 having upstanding flanges 201, 202, each of which has an elongated slot 203 in the side thereof. A lock bar 204 extends between and interconnects the two flanges. The base member is adapted to be held to a reference surface of the car, such as to the floor or to the wall.

A shaft 205 is fitted in the two slots and extends therebetween. This shaft is adapted for only partial rotation (less than 360°, and in this case, 90°) by having a flat 206 milled on one end (FIG. 11). On the other end, the shaft includes a cross slot 207 (see FIG. 12) for purposes yet to be described.

As can best be seen in FIG. 13, wherein the shaft has been reversed 180° from its position illustrated in FIG. 11, it will be noted that the shaft is generally cylindrical and includes a slot 208 to receive the end of the rewinding spring 209 (FIGS. 12 and 13). The function of the rewinding spring is to rewind a belt 210 onto the reel.

With further reference to FIG. 13, braking means comprising a cylinder 211 of friction-type material, such as Teflon or the like, fits snugly on the shaft, and over this there snugly fits a lock member 212. This lock member is rotatable relative to the shaft, but only through the cylinder of brake material so that it is frictionally restrained in a strong manner by the shaft when the shaft is locked. A follow-up washer 213 is loosely spindled over the shaft and abuts cylinder 211. It includes a tang 214 on its outer periphery. Washer 213, by the engagement of tang 214 with the drum of the reel, maintains spring 209 axially oriented on shaft 205.

A pawl 215 (see FIG. 14) includes a follower leg 216, a locking slot 217, and a pair of support legs 218, 219. The pawl fits in the reel at the outside of the lock member so that locking slot 217 is aligned with teeth 220 on the lock member. A pair of sprockets 221, 222 are journaled to the shaft and rotate freely relative thereto. A pair of bars 223, 224 extend between the two sprockets and join the same. Bar 223 overhangs the pawl to keep it from falling loose, and bar 224 serves as an attachment means for belt 210. It will now be seen that the two sprockets and the bars form a reel which is freely rotatable by the belt unless locked by the pawl mechanism. The rewinding spring opposes unwinding of the belt and is connected between the shaft and the sprocket wheels.

An interia washer 225 abuts sprocket 221 and is freely journaled to the shaft. This entire assembly, as shown in FIGS. 11 and 12, fits between flanges 201 and 202 and is held there by heads 226 at the ends of the shaft. Sprocket 221 is pierced in two places to pass follower leg 216 and support leg 218. The pawl pivots inwardly and outwardly around the mounting points of the support legs. Follower leg 216 extends beyond sprocket 221 and enters an opening 227 in the inertia washer. Support leg 219 is pivotally received in washer 213. Pawl 215, then, is pivotally mounted to the reel by leg 218 in sprocket 221 and support leg 219 in the washer. Upon sufficient inertial lag of washer 225 with respect to sprocket 221, pawl 215 is pivoted inwardly to engage slot 217 with teeth 220 of locking member 212 to lock the reel on shaft 205.

The shaft is held against rotation by a yoke 228 which is anchored by a screw 229 to the base. It is this anchorage which forms the base reaction for the rewinding spring and holds the shaft in the rotational position shown in FIG. 9. Were the rewind spring to break, there would be a tendency, shortly to be described, to turn the shaft 90° counterclockwise from the position shown in FIG. 9, at which time flat 206 would abut the wall of slot 203 so as to prevent further rotation thereof.

A safety spring 230, best shown in FIGS. 9, 15 and 16 in a loaded position, has a base end 231 fitting across slot 207 and a bend 232. The spring bears against yoke 228. The spring's tendency is to move the shaft 90° clockwise, which it can do, should the rewind spring break or its restraint fail. When this happens, safety spring 230 will pull its free end 233 into the path of the sprocket teeth and prevent further unwinding motion thereof.

Advantages of the devices of FIGS. 6–16 over those of FIGS. 1–5 reside in the incorporation of a positive lock (the sprocket wheels) which is linear in engagement, and unitary with the reel, rather than a swinging device adjacent to it. Furthermore, the locking action is on the drum rather than a pinching action on the belt, thereby eliminating any reliance on frictional engagement.

Secondly, it is not necessary that the device be oriented in a specified position within the vehicle in order to operate as specified. Eliminating the swinging inertial clamp allows the clamp to be in any position so long as the belt tension causes shaft 119 to slide in holes 117 and 118 to mesh the sprocket wheels with engaging pin 150.

The rotational operation of the drum is the same in FIGS. 6–8 as in FIGS. 1–5, and the cocking and locking of washer 124 is the same as that of washer 40. However, when washer 124 locks onto shaft 119 (through braking member 120) and locks the reel from free rotation, shaft 119 shifts in slots 117 and 118 (bracket 140 strikes the top of pin 116 to prevent shaft rotation), and the teeth of sprocket wheels 123 and 128 engage pin 150. Pin 150, being attached to frame 111, positively prevents wheels 123 and 128 from rotating and thereby positively prevents further belt payout. Should the wheel orientation be such that the teeth of wheels 123 and 128 fail to mesh with pin 150, the nylon braking member 120 will slip on shaft 119 sufficiently to allow wheels 123 and 128 to rotate and mesh properly with pin 150. Thus, brake 119, while not positive, is operable to lock the drum sufficiently so that the belt will move it and engage the pin and sprocket teeth. It permits slippage to the extent that, should a sprocket tooth not be aligned with the pin, the reel can slowly turn until a tooth is aligned, and then the lock is positive on the drum and belt.

As long the belt tension is great enough to overcome the tension of spring 144, pin 150 will restrain sprocket wheels 123 and 128 from rotating. When the belt tension eases up and spring 144 overcomes the tension, shaft 119 slides down toward bottom 112 and the drum is again free to pull in or pay out additional belt length.

There are certain dimensional relationships which should be kept in mind when designing the dimensions of shaft 20, washer 40, cantilever arm 42, and the radial spacing M of arm 42 from the center of shaft 20. It is basic, of course, that the moment produced by the locking action of washer 40 on shaft 20 must exceed the moment exerted by the reel on arm 42, or the device will not lock.

For example, consider an arm 42 having a length L spaced from the center of a shaft 20 by a distance M, exerting a canting force on a washer 40 having a thickness T, and making a close but rotationally free fit on a shaft 20. The hole in washer 40 has a diameter V. These reference letters appear in FIGS. 1, 2, 6, 7 and 8. For practical purposes, diameter V is that of shaft 20.

When the acceleration of the drum is below a preselected level determined by the constant of spring 47 (which may be a very weak spring because there is so little resistance between washer 40 and shaft 20 when the washer is normal to the shaft axis), the spring tows the washer around by arm 42 in direction U (FIG. 2) when the belt is unwinding. It keeps the free end of arm 42 ahead of edge P of hole 43. However, if the acceleration of the drum is such that the spring is stretched because of the inertial lag of the washer and arm 42, then edge P catches up with arm 42 and applies a moment to it which cants and locks washer 40 on shaft 20. This moment is $M_2 = FM$, where F is the tangential component of force applied by the drum. The resisting moment is $M_1 = uFVL/T$, where $u$ is the coefficient of friction between the washer and the shaft. A steel shaft and washer are suitable, and a good material is 4130 steel; the surface of the shaft has a 63 finish, and the inside hole in the washer has a 125 finish. A coefficient of friction of 0.1 is reasonable for this combination. Thus, assuming the following dimensions, it will be seen that the device will lock so long as the drum keeps the washer canted. Assume an initial force $F = 10$ lbs.:

L = 1.0 in.
V = 0.570–0.582 in., fitting over a shaft having a diameter of 0.562 in.
M = .36 in.
T = ⅛ in.

Then $M_1 \cong 4.5$ in. lb., and $M_2 \cong 3.6$ in. lb. With $M_1 > M_2$, the device locks.

When the load is removed and the coil spring takes over to rewind, edge P seeks to "run away" from arm 42, and edge R seeks to overrun it. Were edge R to overrun and cant the washer, then the device could not rewind. Therefore, edge S has been provided on stop 52. In rewinding, the spring tends to pull arm 42 against surfaces R and S, which maintains the arm aligned with the shaft and prevents the washer from cocking during rewinding.

In FIG. 9, the mass and shape of the inertia washer and the slant of slot 227 will be chosen so that the pawl will be pivoted inwardly by a preselected acceleration force exerted by the belt on the reel.

The operation of the device of FIGS. 9–16 will now be described. During ordinary accelerative motions below the predetermined level, the belt will be payed off so as to rotate the reel clockwise in FIG. 9. Follower leg 216 will exert a light force against the inertia washer which will simply follow along without causing the pawl to shift its position appreciably. It will simply rotate relative to the lock member and not contact it. However, should the accelerative forces (tangential relative to the shaft axis) increase above a predetermined level, the sprocket will move faster than the inertia washer can readily take up the energy, and the follower leg will be retarded. Because the slot 227 is slanted, it will cause the pawl to pivot inwardly toward the lock member so as to engage the teeth of the lock member. This will then lock the sprockets to the lock member which can still rotate, but only by exertion of considerable energy through the optional brake means, so that the reel is now restrained against free relative rotation. Were there no brake means, the lock member would be rigidly attached to the shaft and a direct lock would result. In either event, the tangential force on the belt will now cause the reel assembly to shift as a body to the left in FIG. 9, whereupon the teeth of the sprocket will engage lock bar 204 and prevent further rotation. However, should the sprocket be in a position such that the tip of a tooth is against the lock bar when the brake means is used, a slight amount of additional rotation will be permitted by cylinder 211 so that the next tooth can readily engage within the sprocket assembly. Release of this force on the belt will enable the reel assembly to shift back to the right in FIG. 9, a movement which is caused by a bias spring 234 which is connected to yoke 228 for this purpose.

In the event that the rewinding spring breaks, unless safety means were provided, the wearer might not be aware that the belt could be almost entirely payed out. Therefore, safety spring 230 is provided which will turn the shaft 90° counterclockwise, in FIG. 9, should the base support for the spring break or should the rewinding spring itself break. This will prevent further rotation of the shaft and will then draw its free end into the path of the sprocket wheel and lock it against further paying out.

It will be noted that in all the embodiments of this invention there exists a means responsive to accelerative levels on the belt, in excess of a given amount, which will cause an inertia member to lock or restrain a reel relative to further rotation, or at least to limit it to restrained rotation until a sprocket member can come into engagement. The sprocket member is an optional feature of the invention because the inertia members themselves can cause a suitable locking motion relative to the shaft. However, the sprocket members provide an absolute and fully reliable lock.

I claim:
1. A clamping device for a belt section comprising:
 (a) a base member adapted to be anchored;
 (b) a shaft mounted to and restrained rotationally relative to the base member;
 (c) a reel for paying out and taking in the belt section, the reel being rotatably mounted on the shaft;
 (d) means for biasing the reel to take in the belt section;
 (e) an inertia member rotatably mounted on the shaft having a washer section and a cantilever arm, the washer section being rotatably received on the shaft for rotation with the reel in a plane around the shaft, the cantilever arm extending from the washer section away from the plane of rotation thereof into engagement with the reel such that
  (i) the washer section rotates in the plane with the reel below a predetermined value of angular acceleration of the reel, and
  (ii) the cantilever arm is tangentially displaced relative to the shaft when the reel has angular acceleration above the predetermined value to cause the washer section to engage the shaft and restrain rotation of the reel;
 (f) means for yieldably coupling the cantilever arm to the reel to maintain the washer section in the plane of rotation below the predetermined value of angular acceleration; and
 (g) means responsive to the restraining of the reel by the washer section to lock the reel against rotation.

2. The clamping device claimed in claim 1 including: braking means between the washer section and the shaft for permitting limited rotation of the reel on the shaft after the washer section engages the shaft through the braking means.

3. The clamping device claimed in claim 2 wherein: the braking means includes a rotatable element in frictional engagement with the shaft, the washer section being disposed to bear on the rotatable element above the predetermined value of angular acceleration.

4. The clamping device claimed in claim 2 wherein:
 (a) the shaft is mounted to the base member to permit lateral displacement thereof from a first to a second position by the belt section after the washer section engages the shaft; and
 (b) the locking means includes
  (i) at least one sprocket attached to the reel; and
  (ii) means on the base member to engage the sprocket and prevent rotation of the reel when the shaft is in its second position.

5. The clamping device claimed in claim 4 wherein the engaging means on the base includes a bar disposed in the ptth of the sprocket to engage the sprocket when the shaft is in its second position.

6. The clamping device claimed in claim 2 wherein the locking means includes a clamping assembly comprising:
 (a) a clamp mounted on the base for movement between a neutral and a clamping position, the clamp in the clamping position being capable of engaging the belt section and holding the belt section against a pressure surface of the base; and
 (b) a clamp actuator mounted on the base member for engagement by the belt section and for forcing the clamp into its clamping position at a predetermined tension in the belt section.

7. The clamping device claimed in claim 6 wherein: the clamp actuator is pivotally mounted to the base member and mounts a roller in position for the belt section to act through the roller to pivot the clamp actuator and force the clamp into its clamping position at the predetermined tension.

8. The clamping device claimed in claim 7 including
 (a) means to bias the clamping actuator against the tension in the belt section; and
 (b) means to bias the clamp into its neutral position.

9. A clamping device for a belt section comprising:
 (a) a base adapted to be anchored;
 (b) a shaft mounted to and restrained rotationally relative to the base;
 (c) a reel for paying out and taking in the belt section rotatably mounted on the shaft;
 (d) means for biasing the reel to take in the belt section;
 (e) an inertia member rotatably mounted on the shaft;
 (f) a pawl pivotally mounted to the reel and engaged by the inertia member such that at a predetermined angular acceleration of the reel the pawl pivots inwardly toward the shaft in response to an inertial lag of the inertia member with respect to the reel;
 (g) means on the shaft for engaging the pawl when the pawl pivots inwardly to restrain rotation of the reel on the shaft; and (h) means responsive to the engagement of the pawl with the engaging means to lock the reel to the base.

10. The clamping device claimed in claim 9 wherein:
   (a) the engaging means includes an annular, toothed member rotationally restrained on the shaft in position to engage the pawl; and
   (b) braking means is provided which includes frictional restraint means for permitting limited rotation of the reel on the shaft after the toothed member engages the pawl.

11. The clamping device claimed in claim 10 wherein: the braking means includes a rotatable element in frictional engagement with the shaft, the toothed member being mounted to the shaft through the rotatable element.

12. The clamping device claimed in claim 11 wherein:
   (a) the shaft is mounted to the base to permit lateral displacement of the shaft from a first to a second position by the belt section after the toothed member engages the pawl; and
   (b) the locking means includes at least one sprocket as a part of the reel and means on the base to engage the sprocket and prevent rotation of the reel when the shaft is in its second position.

13. The clamping device claimed in claim 12 wherein:
   (a) the shaft is mounted to the base for rotation less than 360°; and
   (b) a safety spring is provided which is deformable upon shaft rotation to stand in the path of the sprocket and stop rotation of the reel when the reel biasing means fails.

14. In a clamping device for use with seat belts of the type having a reel assembly for storing a section of belt, means to bias the reel assembly to take in the belt section, and means to lock the reel assembly against rotation upon the sensing of a predetermined angular acceleration thereof, an improvement in the locking means comprising;
   (a) an inertia member rotatably coupled to the reel assembly for rotation therewith below the predetermined angular acceleration and for rotationally lagging behind the reel assembly above the predetermined angular acceleration;
   (b) means responsive to the rotational lag of the inertia member to restrain rotation of the reel assembly; and
   (c) means responsive to the restraining means to positively lock the reel assembly against rotation.

15. The improvement claimed in claim 14 wherein:
   (a) the restraining means includes a washer and a shaft, the reel assembly being rotatably carried by the shaft, the washer being rotatably received on the shaft for rotation with the reel assembly in a plane around the shaft; and
   (b) the inertia member includes a cantilever arm attached to the washer and extending away from the plane of rotation into pivotal engagement with the reel assembly, the pivotal engagement of the cantilever arm being such that the washer rotates in the plane at angular rates of acceleration of the reel assembly below the predetermined value and the cantilever arm is tangentially displaced relative to the shaft to cause the washer to engage the shaft and restrain rotation of the reel at the predetermined rate of acceleration, the cantilever arm being yieldably coupled to the reel assembly to maintain the washer section in the plane of rotation below the predetermined value of angular acceleration.

16. The improvement claimed in claim 15 wherein the locking means includes:
   (a) a clamp actuator responsive to tension in the belt section produced by the restraining means to rotate to an actuated position;
   (b) a clamp pivotable from a neutral position to a clamping position by the clamp actuator rotating to its actuated position;
   (c) means to bias the clamp actuator away from the actuated position; and
   (d) means to bias the clamp toward its neutral position.

17. The improvement claimed in claim 15 wherein the locking means includes:
   (a) at least one sprocket fixed to the reel assembly;
   (b) the reel assembly being translatable from a first to a second position after the washer engages the shaft; and
   (c) means to engage the sprocket and prevent rotation of the reel assembly when the reel assembly is in the second position.

18. The improvement claimed in claim 14 wherein:
   (a) the restraining means includes a shaft, an annular member rotationally restrained on the shaft having a plurality of circumferential teeth, and a pawl, the pawl being carried by the reed assembly and being capable of pivoting into engagement with the teeth of the annular member; and
   (b) the inertia member is rotatably mounted to the shaft and engaged by the pawl such that at the predetermined acceleration, the inertia member pivots the pawl into engagement with the teeth of the annular member.

19. The improvement claimed in claim 18 wherein the pawl is disposed within the reel assembly, includes a leg passing through a wall of the reel assembly into pivotal engagement with the inertia member, and a locking slot for engagement by the teeth of the annular member.

20. The improvement claimed in claim 19 wherein the locking means includes:
   (a) at least one sprocket fixed to the reel assembly;
   (b) the reel assembly being translatable from a first to a second position after the pawl engages the teeth of the annular member; and
   (c) means to engage the sprocket and prevent rotation of the reel assembly when the reel assembly is in the second position.

References Cited
UNITED STATES PATENTS

| | | | |
|---|---|---|---|
| 2,953,315 | 9/1960 | Lautier et al. | 242—107.4 |
| 2,982,492 | 5/1961 | Spielman | 242—107.4 |
| 3,058,687 | 10/1962 | Bentley | 242—107.4 |
| 3,074,761 | 1/1963 | Ryan | 242—107.4 |
| 3,202,379 | 8/1965 | Wrighton et al. | 242—107.4 |

WILLIAM S. BURDEN, Primary Examiner

U.S. Cl. X.R.

242—107.2